3,073,673
TREATMENT OF LITHIUM ORES
Philip A. Chubb, Suite 1010, 100 Adelaide St. W.,
Toronto, Ontario, Canada
Filed Nov. 27, 1959, Ser. No. 855,560
8 Claims. (Cl. 23—63)

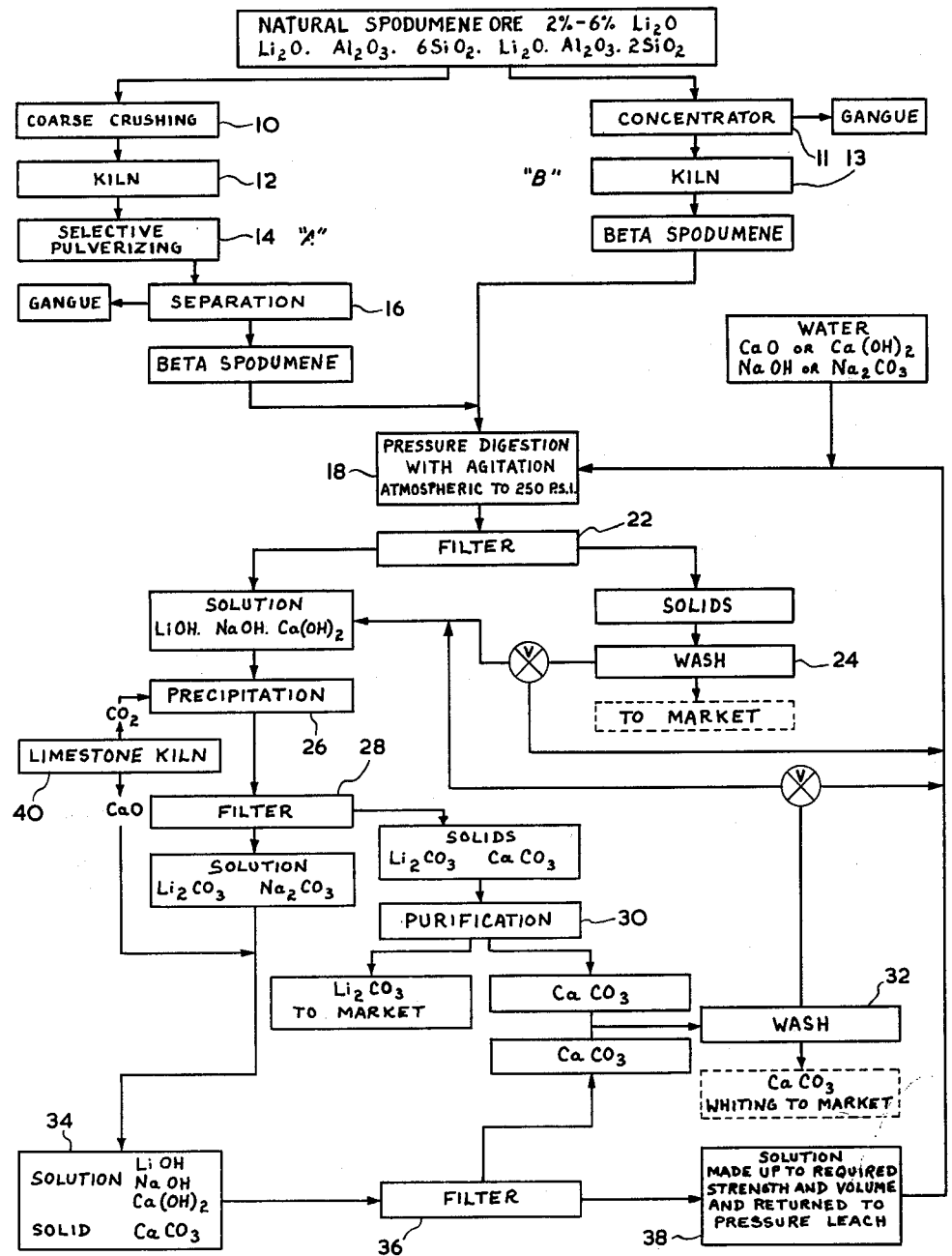

This invention relates to the production of lithium compounds and more particularly to the extraction of lithium carbonate from the mineral spodumene which is chemically known as lithium aluminum silicate.

This application is a continuation-in-part of my application Serial No. 645,040, filed March 11, 1957, now abandoned.

As is generally known and stated in the above application, the composition of lithium aluminum silicate is $Li_2O.Al_2O_3.4SiO_2$ and as found in nature, appears as a relatively inert form known as alpha spodumene. It is known to heat alpha spodumene to temperatures of between 1850° to 1950° F. whereby it is caused to change, or decrepitate into a soft powder, known as beta spodumene. It is believed that alpha spodumene is a mixture or solid solution of two molecules, viz., $Li_2O.Al_2O_3.6SiO_2$ and $Li_2O.Al_2O_3.2SiO_2$ in more or less equal proportions. It is further believed that the conversion from alpha to beta spodumene under the influence of heat affects the separation of the two molecules from solid solution or some form of "unmixing" thereof which renders each type of molecule more easily accessible to chemical reaction assisting in lithium extraction.

My former application disclosed a method whereby beta spodumene is digested in hot water in the presence of both a calcium and a sodium ion to effect a good extraction of the contained lithium. This success was attributed to a dual reaction wherein the sodium ions appeared to react with the $Li_2O.Al_2O_3.6SiO_2$ molecule and the calcium ions appeared to react similarly with the $Li_2O.Al_2O_3.2SiO_2$ molecule. It was further pointed out in my prior application that the criterion of whether or not a calcium or sodium salt may be used in the inventive process depended upon the solubility of the salt in question and that only soluble or slightly soluble salts would do.

Further investigation has shown, however, that for practical purposes near complete extraction can only be obtained when the pressure leaching solution contains either
(a) Sodium and hydroxyl ions, or
(b) Sodium, calcium and hydroxyl ions.

Further research has also shown that a process based on alternative (b) above is preferable because a process based on alternative (a), when carried out with sodium hydroxide (NaOH), for example, results in a gelatinous residue which is difficult to filter and wash. Furthermore, NaOH is a relatively expensive reagent and unless it is used in a process which permits its regeneration, the process is not economical. Accordingly, I have perfected a process based on alternative (b) above, wherein both NaOH and calcium hydroxide ($Ca(OH)_2$) (and/or CaO) are used and wherein the later regeneration of NaOH is possible, producing at the same time a valuable by-product, i.e., precipitated whiting ($CaCO_3$). A further and most important advantage of this process is that the residue formed is easily filtered and washed.

The accompanying drawing shows an illustrative flow sheet of the above process.

Referring to the drawing, crude natural (or alpha) spodumene containing from 2–6% lithium oxide ($Li_2O$) is first converted to beta spodumene. This may be done by any known method and for purposes of illustration two such methods are shown. By method "A" the crude spodumene ore is coarsely crushed at stage 10. The crushed product is heated in a kiln 12 preferably of the rotary type resulting in the conversion of alpha to beta spodumene in soft pulverulent form which is selectively pulverized by well known methods such as wet or dry milling or scrubbing, at stage 14. By selective pulverization I mean pulverization of the beta spodumene which is relatively soft in a manner which tends to leave the gangue materials, largely feldspar and quartz, substantially unreduced in size. The materials so selectively pulverized are separated at stage 16 into gangue which is discarded as waste and beta spodumene now containing from 5–7% lithium oxide. The selective pulverization, of course, assists in the separation which may be by screening classification, air separation or by any other well known means.

By method "B" the crude spodumene is first concentrated at stage 11 and the gangue removed before the ore is heated in kiln 13.

The beta spodumene is then fed to digestion stage 18 where it is mixed with water and with sodium hydroxide and calcium hydroxide or lime (CaO). Soda ash ($Na_2CO_3$) can replace the NaOH since $Na_2CO_3$ will react with $Ca(OH)_2$ forming NaOH and $CaCO_3$. This digestion may take place over a large range of elevated temperatures. However, it is believed that digestion at less than 212° F. will be too slow for commercial economics while the improvement in results obtained at greater temperatures than 400° F. will not warrant the cost of the added heat. The pressure in the digester 18 should range from atmospheric to 250 p.s.i. By p.s.i. is meant pounds per square inch During this digestion it is preferable to agitate the mixture.

From the results obtained by this treatment it is believed the $Li_2O$ of the $Li_2O.Al_2O_3.6SiO_2$ molecule is extracted by water only and the $Li_2O$ of the $$Li_2O.Al_2O_3.2SiO_2$$

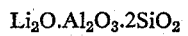

molecule is replaced in part by soda ($Na_2O$) and in part by lime (CaO) with incorporation of hydroxyl ions. The resultant mixture then contains soluble lithium hydroxide, soluble excess sodium hydroxide and calcium hydroxide and insoluble residues.

The mixture is then filtered at stage 22 to remove the insoluble residues. These residues are probably a mixture of clay, analcite, thomsonite and silica which is washed at stage 24 and recovered to give a valuable by-product, primarily for use as a filler.

The solutions from pressure leaching and subsequent washing of residue contain the excess NaOH, the soluble $Ca(OH)_2$ and the extracted LiOH. These solutions are gathered together and gassed with $CO_2$ at stage 26 which converts the LiOH to $Li_2CO_3$, the NaOH to $Na_2CO_3$ and the $Ca(OH)_2$ to $CaCO_3$. The $Na_2CO_3$ is soluble, the $CaCO_3$ is insoluble and the $Li_2CO_3$ is partially soluble. When the solutions are at proper strength most of the $Li_2CO_3$ precipitates with the $CaCO_3$ and the remaining $Li_2CO_3$ stays in solution with the $Na_2CO_3$.

The precipitated $Li_2CO_3$ and $CaCO_3$ is filtered at stage 28 and purified by standard methods, e.g., resolution and reprecipitation, at stage 30 giving the final lithium product $Li_2CO_3$ and $CaCO_3$. The latter is washed at stage 32 and recovered as a second valuable by-product primarily for use as a whiting.

As stated above, the solution from the filter stage 28 contains $Na_2CO_3$ and some $Li_2CO_3$. This solution is now causticized at stage 34 with CaO or $Ca(OH)_2$ whereby NaOH and LiOH are regenerated and $CaCO_3$ is precipitated. The latter is now filtered out of the solution at stage 36 and washed at stage 32 for recovery.

The regenerated alkali solution is now brought up to strength (for additional spodumene processing by recirculation). This is done at stage 38 by the addition of further NaOH and $Ca(OH)_2$ (or CaO) or by the removal of excess water, e.g., by evaporation.

It will be noted that the $CO_2$ gas and CaO used at stages 26 and 34 respectively are produced by calcining CaCO₃ in a separate limestone kiln 40.

What I claim as my invention is:

1. A process for the production of lithium carbonate from spodumene ore comprising the steps of decrepitating the spodumene ore to beta spodumene, pressure leaching the beta spodumene with a leaching solution consisting essentially of water, sodium hydroxide and a calcium compound selected from the group consisting of calcium oxide and calcium hydroxide, said leaching solution thus containing sodium hydroxide and calcium hydroxide, to thereby produce residue solids and a first solution containing lithium hydroxide and excess sodium hydroxide and calcium hydroxide, filtering the solids from said first solution; subjecting the filtered solution to gassing with carbon dioxide gas to precipitate lithium carbonate and calcium carbonate which are then filtered out leaving a second solution containing sodium carbonate and a minor amount of lithium carbonate; purifying the precipitated calcium carbonate and lithium carbonate for recovery of the latter; causticizing the said second solution with calcium oxide to thereby produce a mixture of a solution containing lithium hydroxide, sodium hydroxide and calcium hydroxide and precipitated calcium carbonate; filtering said mixture to separate the calcium carbonate therefrom and bringing this final filtrate up to strength and volume by recirculation.

2. A process for the production of lithium carbonate as claimed in claim 1 including the steps of collecting and washing the calcium carbonate solids for recovery as a valuable by-product, the wash water being recirculated to the pressure leaching stage where its lithium compound concentration warrants.

3. A process for the production of lithium carbonate as claimed in claim 1, including the steps of washing the residue solids resulting from the leaching of the beta spodumene for recovery as a valuable by-product, and passing said wash water to said first solution.

4. A process for the production of lithium carbonate as claimed in claim 1 including the steps of collecting and washing the calcium carbonate solids for recovery as a valuable by-product; washing the residue solids resulting from the leaching of the beta spodumene and recovering the residue solids as a second valuable by-product; the wash waters, in each case, being passed to said first solution.

5. A process for the production of lithium carbonate as claimed in claim 1, in which said leaching takes place at between 212–400° F. and at a pressure between atmospheric and 250 p.s.i.

6. A process for the production of lithium carbonate as claimed in claim 4, in which said leaching takes place at between 212–400° F. and at a pressure between atmospheric and 250 p.s.i.

7. The process as claimed in claim 3 wherein said wash water is recirculated directly to said leaching solution and thereby passed to said first solution.

8. The process as claimed in claim 4 wherein said wash waters, in each case, are recirculated directly to said leaching solution and thereby passed to said first solution.

References Cited in the file of this patent

UNITED STATES PATENTS

| | | |
|---|---|---|
| 2,021,987 | Colton | Nov. 26, 1935 |
| 2,413,644 | Nicholson | Dec. 31, 1946 |
| 2,662,809 | Kroll | Dec. 15, 1953 |
| 2,940,820 | Mazza | June 14, 1960 |